Oct. 21, 1958     D. MORGULOFF     2,857,119

JET STEERING AND BRAKING SYSTEM FOR AIRCRAFT

Filed March 21, 1956     2 Sheets-Sheet 1

INVENTOR.

Oct. 21, 1958  D. MORGULOFF  2,857,119
JET STEERING AND BRAKING SYSTEM FOR AIRCRAFT
Filed March 21, 1956  2 Sheets-Sheet 2

INVENTOR.

United States Patent Office 2,857,119
Patented Oct. 21, 1958

2,857,119

JET STEERING AND BRAKING SYSTEM FOR AIRCRAFT

Daniel Morguloff, Dallas, Tex.

Application March 21, 1956, Serial No. 572,930

5 Claims. (Cl. 244—52)

This invention relates to aircraft, and more particularly to means for varying the thrust exerted by an aircraft jet engine.

The design characteristics which have made possible more advanced flight speeds in aircraft have tended to enforce the necessity of high landing speeds, and this has been accompanied by increasingly serious problems relating to, for example, the accomplishment of smooth, rapid deceleration of the aircraft after landing touchdown. Various arrangements have heretofore been proposed for reversing the propulsive thrust provided by the engines of jet-propelled aircraft in order to provide ample braking forces, and the present invention is directed to an improved system for achieving such reversal of thrust of an aircraft jet engine following landing touchdown as well as for varying the net thrust of the engine at other times.

In the landing sequence, during the approach to the runway, an aircraft is generally in descending flight which, as contact with the runway becomes imminent, should be at as low an airspeed as is consistent with safety of flight in order that touchdown may be made at as low a speed as possible. As the aircraft's speed is thus desirably held to a minimum, and as the aircraft also ordinarily is descending, the forwardly directed propulsive thrust required from its power plant at such a time is relatively small, and the engine throttle setting accordingly must be considerably reduced. This throttling back of the engine results in the desired reduction of thrust, and of course is followed by a corresponding reduction in the rate of rotation of the engine turbine and compressor. Although the vast majority of contemplated landings are consummated as planned, there is always existent during any landing routine the possibility that, even in the last few seconds preceding touchdown on the runway, some event or condition may occur or be discovered which prohibits the consummation of the intended landing. In such a case, the pilot must refuse the landing: that is, he must check the descent of the aircraft and maintain or quickly bring it back to an airspeed sufficient for level flight as well as for any increases in altitude which the particular situation may require. For these purposes, a great need will of course exist for the prompt application of a relatively great forwardly directed thrust on the airframe. Such a prompt increase in forward thrust has not heretofore been obtainable, and however, for among other factors, the previously slowed compressor of the engine cannot at once supply the engine with all the air required for production of power of the magnitude needed. Instead, the engine power output will rise relatively slowly as the inertia of its moving parts is overcome and the compressor is accelerated to high speed; requiring precious seconds, the acceleration may very possibly take too long, and the desperately needed increase in forward thrust may come too late to avert a crash.

It is accordingly highly desirable to provide a means of securing a prompt increase in the forward thrust imposed upon an aircraft by its propulsive jet engines. It is contemplated that this end may be accomplished by an arrangement which is quickly variable between a configuration wherein the engine may be kept at a high level of power production during low-speed flight, as in landing approach, without imposing more than a desired low forward thrust on the aircraft, and another configuration in which all the thrust produced by the engine is applied in a forward direction to the aircraft. By such an arrangement, there is no necessity of slowing the engine during low-speed flight; hence, no acceleration period must elapse before the engine power output can be raised to a desired level.

The improved thrust-varying system includes at least one duct having at one of its ends an opening which communicates with the interior of and is adapted for receiving exhaust gases from the exhaust passage of a jet engine. The duct extends outwardly from the engine beyond the airframe skin, and its outer end is provided with a forwardly directed external opening, which may be bevelled at an angle to the aircraft centerline, for discharging the exhaust gases into the atmosphere in or at an acute angle to the direction of flight and thereby producing a reverse thrust. Where a plurality of the thrust-varying ducts are employed, they preferably should be mounted in symmetrical opposition to each other on the airframe so that when all are operated simultaneously any yawing or pitching moments of their respectively produced thrust forces will mutually cancel each other and hence not produce trim changes in the aircraft and so that when operated individually or in asymmetrical combinations the resulting trim changes may be used for flight control of the aircraft. Valve means are included for varying the rate of flow of exhaust gases into and through each duct, and actuator means are provided to make possible the positioning of the valve means. Provisions are made for making the passive aerodynamic drag of the external portion of the thrust-varying duct as low as possible. Where the invention is employed to take combustion gases from a jet engine at a point reasonably near the leading edge of an aerodynamic surface such as, for instance, a vertical or horizontal stabilizer, the net drag penalty imposed by the duct may be made virtually zero by mounting it within the aerodynamic surface so that it extends through the root thereof to the engine exhaust passage in the fuselage, and so that the forwardly directed opening of the duct to the atmosphere is located in the leading edge of the aerodynamic surface. For increased reverse thrust, a plurality of such ducts, as mentioned above, may be employed in connection with any one jet engine. When not enough outwardly extending aerodynamic surfaces for control and/or stability exist on the airframe where, for engine design or other considerations, a number of thrust-varying ducts which are to be installed on the aircraft should to best advantage be located, streamlined fairing means may be provided especially for the exterior portions of each duct not mounted in such an aerodynamic surface. To implement added control over the quantity of exhaust gases flowing through the thrust-varying duct or ducts, there may be provided in the engine exhaust passage an axially displaceable blocking member which in normal operation does not obstruct the flow of gases out of the rearwardly directed exhaust outlet of the engine, but which, when the reverse thrust duct or ducts are placed in operation, is caused to approach or close against a seat in the engine exhaust passage, thus forcing some or all of the engine exhaust gases to flow out the ducts. Control means are provided for regulation of the several actuators of the duct valve actuating means and for regulation of the position of the blocking body. The control means should preferably enable the pilot, with use also of the engine throttle or equivalent, to coordinate the engine power output, the position of the blocking body, and the positions of the duct valves.

It is, accordingly, a major object of the present invention to provide, in an aircraft provided with a jet propulsion unit, an effective braking means which employs reactive thrust developed by the jet propulsion unit to decelerate the aircraft before and/or after landing touchdown.

Another object is to provide means of the sort just stated which makes low flight speeds possible in the aircraft while maintaining the power output of the jet propulsion unit at a relatively high level.

Still another object of the invention is to provide thrust-varying means adapted for optional deflection of rearwardly moving engine exhaust gases and the forwardly directed expulsion of the same into the atmosphere, whereby a rearwardly directed reactive force is imposed upon the aircraft.

Yet another object is to provide means of the sort stated above wherein the net thrust developed by the engine at any particular power setting may be varied as desired from purely forward thrust to zero and even to strongly negative thrust either before or after landing touchdown.

A further object is to provide means such as thus far described which makes possible the delivery with great promptness of adequate forward thrust from a jet propulsion unit to an airframe to the end that the thrust may be quickly available when needed.

An additional object of the invention is to provide, for a jet-propelled aircraft, a reverse thrust system or arrangement which is simple to construct and operate and relatively light in weight, and which has only a few moving parts.

A still further object of this invention is to provide means such as specified above comprising individually operable units for yielding control forces for maneuvering in flight or on the ground.

Other objects and advantages will be apparent from the specification and claims and from the accompanying drawings which illustrate an embodiment of the invention.

Figure 1:
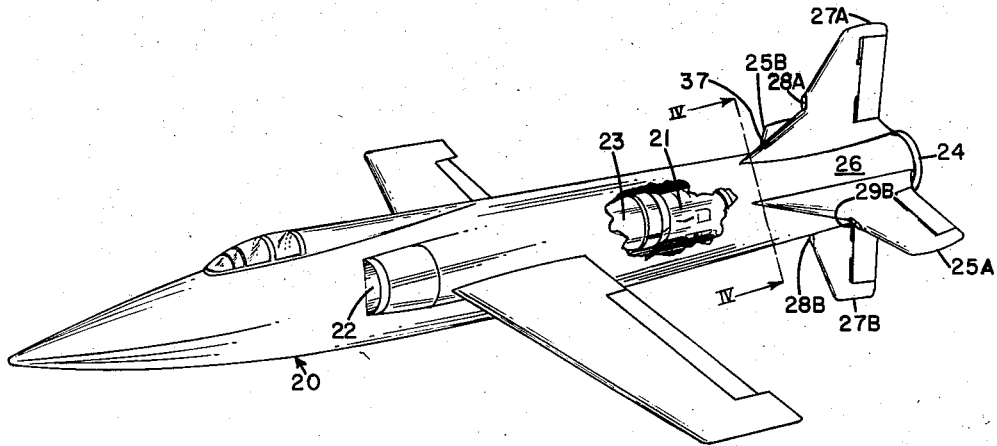
Figure 1 is a perspective view of a jet-propelled aircraft having vertical and horizontal tail surfaces and showing the external openings of the thrust-varying ducts.

Referring now to Figure 1, a winged aircraft 20 has a fuselage 20 in which is housed a turbojet engine 21. The engine is supplied with combustion air by air ducts whose aft ends are connected as at 23 to the air inlet of the engine 21 and whose forward ends are provided with external openings or inlets such as 22. The engine exhaust gases are normally expelled rearwardly into the atmosphere at the fuselage aft end 24 for producing thrust for propelling the aircraft forwardly. The aircraft has symmetrically mounted thereon left- and right-hand horizontal tail surfaces 25A, 25B and a vertical tail surface 27A; there may also be provided a second vertical tail surface 27B mounted symmetrically opposite the first on the bottom of the fuselage. Each surface 25A, 25B, 27A, 27B respectively houses a thrust-varying duct (to be shown and described) which is connectable into the exhaust passage of the engine 21. The upper duct terminates at the leading edge of the vertical tail 27A, and a leading-edge cut-out or aperture 28A in the skin of the latter communicates between the atmosphere and the interior of the upper duct. The left-hand, right-hand, and lower ducts similarly terminate at the leading edges of the tail surfaces 25A, 25B, or 27B in which they are respectively housed, which surfaces are in turn provided with leading-edge cut-outs forming apertures 29A, 29B, or 28B similar to the aperture 28A described above; and these apertures are each, as is the upper aperture 28A, provided with individual outer valve members (to be described). The four tail surfaces provide excellent fairing and housing means for their respective ducts.

Figure 2:
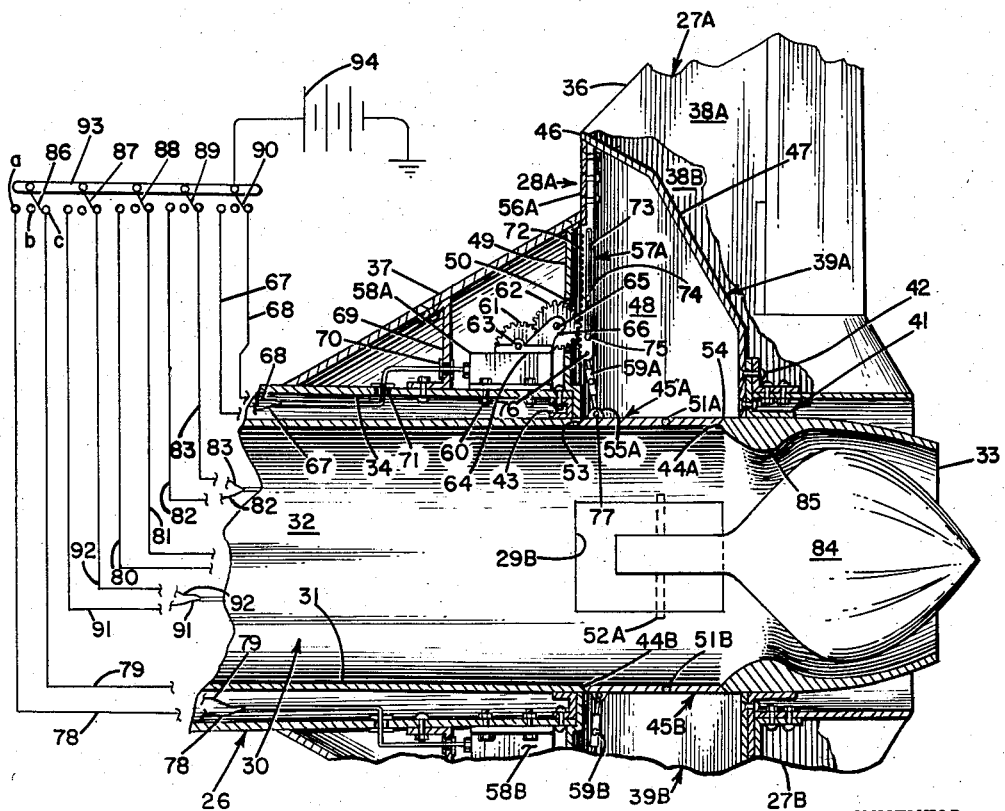
Figure 2 is a longitudinal vertical sectional view of the fuselage aft portion showing details of the thrust-varying ducts.
Figure 3:
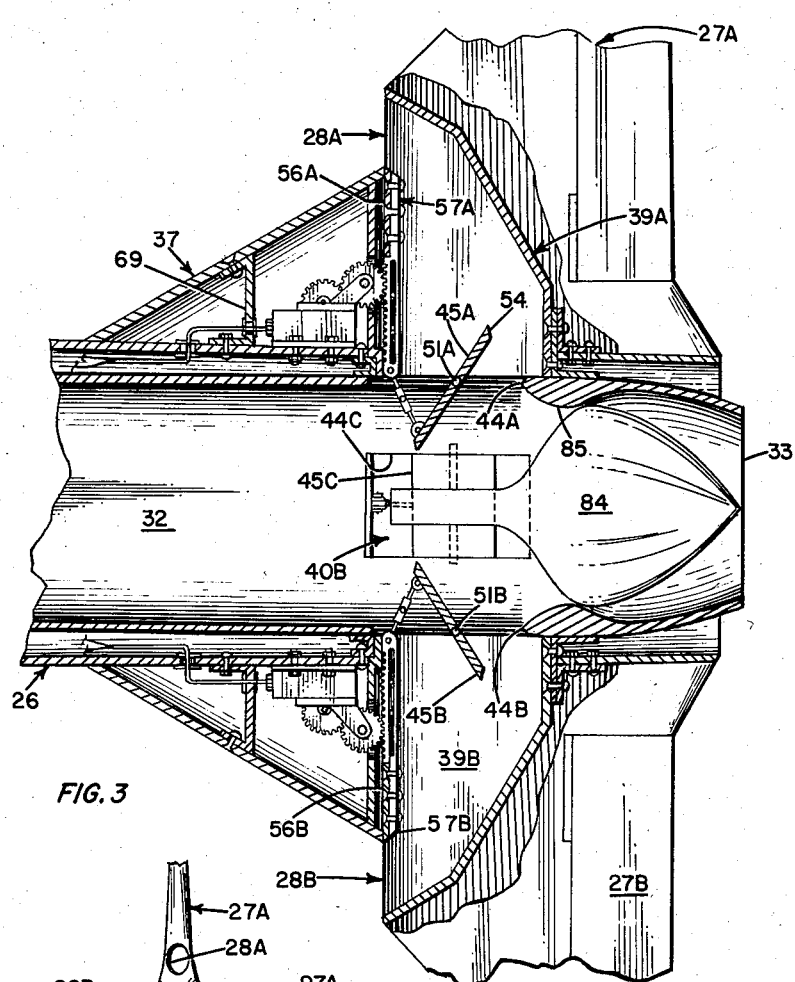
Figure 3 is a view similar to Figure 2, the duct valve members and the blocking member being shown in alternate positions thereof.

With added reference to Figures 2 and 3, engine exhaust gases normally flow rearwardly through the engine exhaust passage 30, the latter being defined by the wall 31 of a tubular member 32 integral with or connected to the aft end of the engine 21 and having at its rearward end an opening 33 into the atmosphere, and the exhaust gases are expelled rearwardly through this opening 33 for propelling the aircraft. The wall 31 is generally concentric with and is inwardly spaced from the fuselage wall 34. Projecting upwardly from the fuselage 20, the vertical tail surface 27A has a rearwardly slanting leading edge 36 blended into the fuselage upper surface by a fairing 37, and has left- and right-hand spaced-apart skins 38A, 38B which form the exterior surfaces of the vertical tail and extend forwardly therefrom to also cover the fairing 37. Between the left- and right-hand skins 38A, 38B, which are continuous at the leading edge 36, there lies a cavity, and mounted largely within this cavity is the upper duct 39A.

The duct 39A may vary in form and construction, but in all cases must extend inwardly into the fuselage 20 to the engine exhaust passage wall 31 and outwardly from the fuselage to an outer surface of the body in which it is enclosed, in this case, to the leading edge 36 of the upper vertical tail 27A. A tight seal required between the duct inner end and the outer surface of the engine exhaust passage 30 may be effected as by a flexible, heat-resistant sealing member 41 attached by fasteners 42 in sealing contact with the duct 39A and having a foot portion 43 which presses sealingly against the wall 31 all around the inner end of the duct. An inlet aperture 44 is made through the exhaust passage wall 31 into the duct 39A for the admission of exhaust gases into the duct, and this opening is provided with inner valve means comprising a close-fitting door 45A. The outer end of the duct 39A must open to the atmosphere in order that a gaseous jet may issue therefrom, and in order that the reactive force produced by the jet may be utilized for braking or effecting flight or ground control of the aircraft, the jet must issue from the outer opening in some direction other than a purely rearward direction. To provide an outer opening, some of the vertical tail surface leading edge skin is cut away and the resulting opening is filled by the upper end of the duct 39A, the upper rim 46 of the duct lying flush with the surrounding skin and defining the duct's outer aperture 28A. So that transversely as well as rearwardly directed thrust forces may be produced, the aperture 28A is so located that the jet is discharged at an angle to the centerline of the aircraft. The upper duct 39A has an aft side 47, right-hand side 48, forward side 49, and a left-hand side not shown in Figure 2 but similar to the right-hand side 48. To impart some upward velocity to gases as they move through and from the duct, the duct aft wall slants forwardly and upwardly to the top of the outer aperture 28A. Existing parts of the upper tail 27A might be utilized to form parts of the duct 39A. Thus, where the tail parts involved are made of materials capable of withstanding the high temperatures of the exhaust gases, the left- and right-hand sides of the duct may be formed by the left- and right-hand skins 38A, 38B, while added or already existing partition members, if properly located, may serve as or take the places of the forward and aft walls 49, 47. In each case, the forward wall 49 should have a relatively small slot 50 therethrough whose purpose will be explained in a later paragraph. Except for this slot 50, the duct 39A should provide a gas-tight conduit extending between the inner and outer apertures 44A, 28A.

The inner valve member 45A, when closed, completely stops the lower aperture 44A and isolates the interior of the duct 39A from the exhaust passage 30; when moved out of its closed position, it allows the entry of exhaust gases into the duct 39A from the engine exhaust passage 30 through the aperture 44A. It is contemplated that the inner valve member 45A may also serve as a deflector for inducing gaseous flow into the duct 39A. The valve member 45A is made in the form of a plate of such size and outline that, in its closed position, it snugly fills the inner aperture 44A and lies flush with the inner surface of the exhaust passage wall 31, on which wall it is pivotally mounted by means of a pin 51A which extends transversely of the centerline of the aircraft and is located somewhat aft of the fore-and-aft middle of the valve member 45A in order that the greater area of the valve portion lying forward of the pivot pin will receive more upwardly directed force from the engine exhaust gases than will the smaller-area valve portion aft of the pin and hence will tend to hold the valve in its closed position. The member 45A has a bevelled forward edge 53 (Figure 3) which lies at an acute angle to its lower face and, in the closed position of the member (Figure 2), fays with a matching wall bevel at the forward border of the inner aperture 44A; its aft edge 54 is bevelled at an acute angle to its upper face and similarly fays with a matching wall bevel at the aft border of the aperture 44A. When the valve member 45A is closed, the bevels improve the efficiency with which the member 45A seals the inner aperture and act as stops which strike the passage wall 31 and prevent movement of the valve member past its closed position. On the other hand, the bevels freely allow opening movements of the valve member 45A, which is adapted to pivot on the pin 51A in such manner that its forward edge 53 may move arcuately downward into the fast flow of gases in the exhaust passage 30, its aft edge 54 at the same time moving upwardly into the duct 39A. In such a position, the valve member 45A allows the free entry of exhaust gases into the duct 39A and is very effective in inducing them to flow into the duct 39A. The inner valve member is provided on its upper face with a fitting 55A for attachment of an actuating means to the valve member at a point somewhat forward or aft of the pivot pin 51A. The valve member may be made in other forms as may be desired: for example, it may be made to pivot at a lateral edge along a line generally parallel to the longitudinal centerline of the exhaust passage. Again, the valve 45A may be made to pivot at a forward edge or may have a sliding motion imparted to it to clear the aperture 44A, still other arrangements being readily possible and optionally employable where a blocking means, to be described, is used for partially or totally shutting off the exhaust passage 30 at times selected by the pilot of the aircraft.

The outer aperture 28A is selectively opened and closed by an outer valve member 56A which is of plate-like form and, in its closed position (Figure 2), lies flush with the skin covering the leading edge 36 and completely stops the aperture 28A. The member 56A may be moved from this closed position to an open position (Figure 3) wherein its upper edge is flush with the upper edge of the duct forward wall 49, or to any intermediate position therebetween. The member 56A is mounted on the rack 57A of an actuating means described below.

The actuating means comprises an actuator 58A, rack 57A, and link 59A. The actuator 58A, mounted by fasteners 60 on the fuselage wall 34 within the fairing 37, houses a motor which drives a gear 61 extending out through the case wall and rotatably mounted thereon by a pin 63 and mounting fixture 64. Driven by the gear 61, a pinion 62 is mounted by a pin 65 on ears 66 of the fixture 64, and is positioned to extend through the wall slot 50. The slot 50 is preferably made as small in all its dimensions as is possible without hampering free rotation of the pinion 62. The motor of the actuator 58A is reversible and is supplied with electrical power through a pair of electrical leads 67, 68 selectively connectable through a control means (to be discussed) to a source of electrical power; the motor should be provided with limit switches which cause it to stop turning the pinion 62 when the rack 57A has reached either its uppermost or its lowermost position.

Inside the fairing 37, a gas-tight partition 69 extends between the fuselage wall 34 and the fairing skin 37. The partition acts as a bulkhead which prevents forward flow of the relatively small quantity of exhaust gases which may enter the fairing interior through the slot 50. The electrical leads 67, 68 enter the fuselage 20 through sealing grommets 70, 71 mounted in the partition 69 and fuselage wall 34.

The rack 57A is a vertically disposed bar having teeth 72 which engage the pinion 62 and at its upper end portion is attached to the outer valve member 56A. The rack is mounted in the duct 39A by any convenient means which will permit it to move upwardly and downwardly far enough to effect closing and opening of the outer aperture 28A of the duct by the outer valve member 56A, yet will not permit it to move forwardly or rearwardly relative to the duct. The rack 57A of the example has a slotted opening 73 made therethrough between its left-hand and right-hand sides, and is slideably mounted on two parallel pins 74, 75 which extend through the slotted opening 73 and whose four ends are rigidly attached to the left- and right-hand walls of the duct 39A. The spacing and location of the pins 74, 75, and the length of the rack's slotted opening, mut be such that the rack 57A has freedom of movement in a vertical direction over a sufficiently wide range to permit full opening and closing of the outer valve member 56A, but yet is restrained from moving too far upwardly or downwardly.

The actuator link 59A is pivotally connected at its upper end by a pin 76 to the lower end of the rack 57A, and at its lower end by a pin 77 to the fitting 55A provided on the upper face of the inner valve member 45A which, in the arrangement shown, is located forward of the inner valve member pivot pin 51A.

While only the upper duct 39A and its actuating means and valve members have been described above, the description may, bearing in mind their differences in location, be applied in all significant respects to a right-hand duct provided in the right-hand horizontal tail surface 25B, the same having an inner aperture 44c closed by an inner valve member 45C with a pivot pin 52A; a left-hand duct in the left-hand tail surface 25A (Figure 1), not seen in Figures 2 and 3; and a lower duct 39B in the lower vertical tail surface 27B, each of these ducts being provided with inner and outer valve members corresponding to the inner and outer valve members 45A, 56A and each having an actuator means comprising elements corresponding to the actuator 58A, rack 57A, and actuator link 59A of the upper duct 39A. Each of the three actuators thus provided in addition to the actuator 58A described above has a pair of electrical leads similar in function and routing to the leads 67, 68 shown and described, the left- and right-hand actuator leads not appearing in the drawing except in the diagrammatic portions of Figures 2 and 3 depicting the control means switches and their connections. There are thus provided the lower actuator "open" and "close" leads 78, 79, left-hand actuator "open" and "close" leads 80, 81, and right-hand actuator "open" and "close" leads 82, 83, The blocking member 84 is an axially displaceable conical member which may be caused to close against a seat 85 on the exhaust passage wall 31, thus shutting off the passage 30, or to move away from the seat 85 to allow unimpeded flow out the aft end 33 of the exhaust passage, its position being adjusted by means of any suitable contrivance controllable by the pilot in conjunction with all the duct inner and outer valve members' actuating means just described. As shown in Figure 2, the blocking member 84 is moved away from the seat 85 when the valve members are closed, and may be caused to close against the seat when the valve members are open. The means employed for actuation of the blocking member 84 should be well matched in its promptness of action with the actuating means employed for the duct valve members in order that it may open and close at a rate matching corresponding closings and openings of the valve members.

Figure 4:
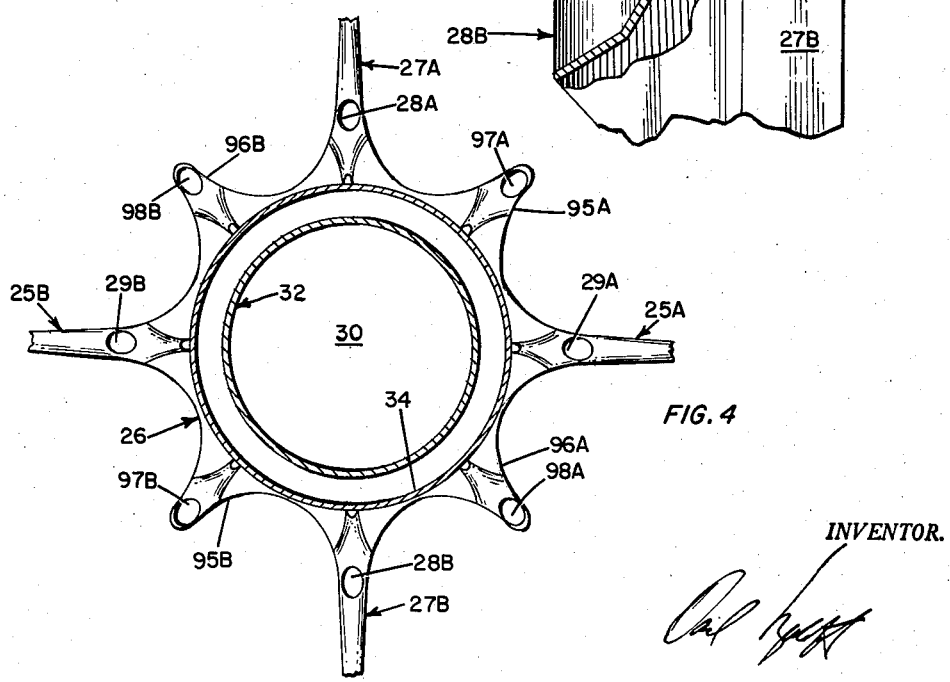
Figure 4 is a cross-sectional view taken along the line IV—IV of Figure 1 and showing ducts mounted in individual fairings as well as in the vertical and horizontal tail surfaces of the aircraft.

The control means comprises five switches 86–90 each having three contacts $a$, $b$, and $c$. The "open" lead 78 of the actuator 58B for the lower duct valve member is electrically connected to the $a$ contact of the control switch 86 and the "close" lead 79 is connected to the $c$ contact. The $b$ contact lies between the $a$ and $c$ contacts and provides the switch with an "off" position. The "close" lead 91 of the blocking body actuating means is connected to the $a$ contact of the switch 87, and its "open" lead 92 to the contact $c$. The "open" leads 80, 82, 67 of the left-hand, right-hand, and upper actuators are similarly and respectively connected to the $a$ leads of the switches 88, 89, 90, and their "close" leads 81, 83, 68 are connected to the corresponding $c$ contacts. All five switches 86–90 are connected to a bus 93 which in turn is connected to an electrical power source 94. Other control arrangements are obviously practicable, the control means of the present example being presented only for purposes of illustration and explanation. Placing all the switches 86–90 in their $a$ position connects all the duct valve actuators through their respective "open" leads 67, 78, 80, 82 with the source of electrical power 94 and thereby energizes the actuators for effecting opening of the inner and outer valve members of all the thrust-varying ducts; at the same time, the means chosen for actuation of the blocking member is energized through its "close" lead 91 for bringing about simultaneous movement of the blocking member 84 toward the exhaust passage seat 85. Placed all in their $b$ positions, the switches 86–90 disconnect all the valve actuators and the blocking member actuating means from the source of electrical power, thus stopping them in whatever respective positions they might at that time occupy. In their $c$ position, the switches 86–90 connect all the valve actuators through their respective "close" leads 68, 79, 81, 83, and the blocking member actuating means through its "open" lead 92, to the source of electrical power, thus effecting movement of all the duct valves toward their closed positions and movement of the blocking member away from the seat. Because of the limit switches in the actuators and blocking member actuating means, no harm results from leaving the switches 86–90 in the $a$ position after the valve members have reached their fully opened positions and the blocking member its closed position, or in the $c$ position after the valve members and blocking member have reached their respective closed and fully opened positions.

Where it is desired to operate one duct's actuating means individually, such may readily be effected by appropriate manipulation of the control means switch governing the actuator of that duct. For instance, placing the switch 86 in its $a$ position will cause opening motion of the lower duct valve members, moving the switch 86 to its $b$ position will stop those valve members in their current positions, and placing the switch 86 in its $c$ position will cause closing motion of those valve members without any effect at all upon the valve members of the three other ducts or of the blocking member. Any combination of duct valve actuators may be made to operate together by means of the control means switches 86, 88–90. The blocking member of course may also be independently adjusted in its position by manipulation of the switch 87.

Where the thrust-varying ducts installed in the vertical and horizontal aerodynamic surfaces, such as the tail surfaces 25A, 25B, 27A, 27B (Figure 1) already provided on the aircraft are not considered sufficient, it is entirely feasible to add other thrust-varying ducts similar in their form, valves, actuating means, control means, and connections to the engine to the ducts already described. Figure 4 shows an aircraft with four tail surfaces 25A, 25B, 27A, 27B such as shown in Figure 1 all of which are provided with ducts having respective outer openings 28A, 28B, 29A, 29B. The aircraft has four additional ducts arranged symmetrically and in fore-and-aft alignment with the four ducts in the tail surfaces 25A, 25B, 27A, 27B, and the added ducts are housed in individual streamlined fairings 95A, 95B, 96A, 96B each of which has a forward opening or outer aperture 97A, 97B, 98A, or 98B for the reverse thrust duct mounted within the fairing.

When the aircraft is making a take-off run, the pilot will normally want full power from the engine 21 for acquiring as quickly as possible sufficient airspeed for making the aircraft safely airborne. Occasions have arisen, however, when take-offs have had to be refused after the take-off run has been begun. On such an occasion, at the moment of decision to refuse the take-off, the duct inner and outer valve members, the members 45A and 56A having been described as examples, will normally be entirely closed to prevent any flow of exhaust gases through the ducts and the blocking member 84 will be unseated, as in Figure 2, to allow an unimpeded flow of exhaust gases out of the aft end 33 of the exhaust passage 32. The engine 21 will normally be regulated for delivery of its full forward propulsive thrust to the aircraft, therefore the flow of gases out of aft end of the exhaust passage will be at or near maximum value.

Having decided to bring the aircraft to a halt, the pilot will place all the switches 86–90 in their $a$ positions, thus opening all the inner and outer valve members in unison and simultaneously closing the body 84 against the seat 85. The large flow of engine exhaust gases is constrained to flow forwardly out of thrust-varying ducts, thereby producing an exceedingly strong rearward thrust which quickly brings the aircraft to a halt. Moving in a direction having a forward component as they leave the ducts, the gases produce the above-mentioned reverse thrust for braking the aircraft. As this thrust is applied well aft of the center of gravity of the aircraft and symmetrically about its centerline, it has no tendency to cause swerving, but is instead a positive aid to keeping the aircraft aligned with the runway. As the aircraft slows to a safe speed, the power setting of the engine 21 may be reduced and the actuator switches 86, 88–90 and blocking member actuating means switch 87 may be flicked briefly from their $b$ to their $c$ positions as many times as desired for partially closing the inner and outer valve members and for moving the blocking body a corresponding interval away from the seat 85 to a position intermediate between its closed and fully open positions, thus limiting the flow of gases out through the outer apertures and allowing the flow of a fraction of the engine gases out through the exhaust passage rear end 33 and accordingly reducing the braking action exerted by the exhaust gases. Having reached a safe taxiing speed and having full control over his aircraft, the pilot may place and leave the switches 86–90 in their $c$ position and thereby cause the inner and outer valve members to shut off all flow through the ducts an dthe blocking member to move to a position allowing unobstructed flow of gases out the rear end of the exhaust passage. Used in pairs located 180 degrees apart around the aircraft centerline, the ducts will produce no net turning effect on the aircraft. Used singly or in asymmetrical combinations, such as a pair located 90 degrees apart, or a trio, the ducts will produce a net turning force on the aircraft which may be utilized for control purposes on the ground or in flight.

In normal flight, the valve members and the blocking body, as shown in Figure 2, are positioned for allowing full unimpeded flow of the engine exhaust gases out the aft end of the exhaust passage. If for some reason the pilot should desire to sharply brake his aircraft and/or control it in pitch or direction in flight, he may manipulate some or all the switches 86–90 to decrease the flow from the aft end of the exhaust passage and provide a flow of exhaust gases through all or selected ones of the outer apertures to apply a desired braking and/or flight control force to the aircraft. Rather than decreasing the engine power setting at such a time, the pilot may increase it and may manipulate the switch 87 for partial or total seating of the blocking member in order that much or even all the exhaust gases will be forced to leave the aircraft through the outer apertures of the ducts in order that their energies may be employed in producing a braking and/or flight-control thrust; consequently, the higher the power output of the engine, the higher may be the force produced. When the aircraft has been slowed to a desired airspeed or brought to a desired attitude or flight direction, the pilot should place all the switches 86–90 in their c position to cause closing of all the inner and outer valve members and movement of the blocking body to a position not obstructing the flow of exhaust gases, and he should of course regulate the engine power setting as needed to make it consistent with current flight needs.

As the aircraft approaches a runway on which a landing is to be effected, it is desirable that the net forwardly directed propulsive force be reduced to the minimum required for maintaining a minimum safe flying speed. Rather than radically reducing the engine power setting, which as explained could leave the pilot in serious circumstances for lack, in an emergency, of promptly available power, the pilot may adjust the net forward thrust to a proper level while retaining or even increasing the throttle setting already established in cruising flight. The thrust adjustment is made by intermittently placing the duct valve actuator switches 86, 88–90 in their a position and regulating the position of the blocking member by use of the switch 87 until the desired reduction in thrust is effected. This reduction will occur before the inner and outer valve members have been moved all the way to their open positions and the blocking member to its closed position; in other words, in some intermediate position of those members, the reverse thrust produced by the exhaust gases flowing past the valve members and out the outer apertures of the ducts will cancel enough of the forward thrust produced by gases still flowing out the aft end of the engine exhaust passage to result in a net forward thrust of proper value.

If some emergency forces the pilot, when very near the ground to refuse the landing, he may safely do so by placing all the switches 86–90 in their c position for quickly closing the valve means of all the thrust-varying ducts and causing the blocking member simultaneously to be moved to its position allowing full flow of exhaust gases out the aft end of the exhaust passage 32, thus very promptly applying adequate forward thrust to the aircraft. As, by means of the invention, the engine 21 was never reduced to a low power setting during the approach, no acceleration period must elapse before adequate power can be obtained from it; consequently, the pilot is promptly enabled to level the aircraft and regain altitude as may be necessary.

Where no emergency occurs and the pilot is able to touch down on the runway according to plan, the engine throttle and thrust-varying system are operated as previously described for securing necessary regulation of forward thrust values during the approach; and when the landing gear has contacted the runway and it is desired to brake and guide the aircraft, the pilot may proceed to reduce his ground speed and effect directional control by operating the thrust-varying system in a manner such as described above; and by the strong braking and directional control forces thus applied to the aircraft, he is enabled safely to guide and quickly to slow and stop the aircraft on the runway.

While only one embodiment of the invention and one modification thereof have been shown in the accompanying drawings, it will be evident that further modifications are possible in the arrangement and construction of the reverse thrust system components without departing from the scope of the invention.

I claim:

1. For an aircraft having a propulsive jet engine, a thrust varying system comprising: an exhaust passage receiving the combustion gases of said engine and having a rearward opening for expulsion of said gases therethrough in a first, rearward direction relative to said passage, said passage having a sidewall provided with an opening; a first door pivotally mounted on said sidewall and variably positionable for variably stopping said sidewall opening; means operative for variably positioning said first door; a fin-like body mounted on said aircraft, said body having an opening communicating between the interior of said body and the atmosphere; a duct mounted at least in part within said fin-like body, said duct communicating with said exhaust passage through said sidewall opening and opening into the atmosphere through said opening of said fin-like body, said duct being adapted for receiving gases from said exhaust passage and for expulsion of the same into the atmosphere in a second direction for producing a reactive force; a second door mounted in said duct and variably positionable axially of said duct for variably stopping said opening into the atmosphere of said duct; and means operative for variably positioning said second door.

2. For an aircraft having a propulsive jet engine, a thrust varying system comprising: an exhaust passage receiving the combustion gases of said engine and having a rearward opening for expulsion of said gases therethrough in a first, rearward direction relative to said passage, said passage having a sidewall provided with a plurality of openings symmetrically spaced about the circumference of said passage; a first plurality of valves mounted on said sidewall, each one of said valves being variably positionable for variably stopping a respective one of said sidewall openings; a plurality of streamlined fin-like bodies symmetrically mounted on the exterior of said aircraft, each of said streamlined bodies being in register with a respective one of said sidewall openings and each of said streamlined bodies having an aperture communicating between the interior thereof and the atmosphere; a plurality of ducts, each of said ducts being mounted at least in part within a respective one of said streamlined bodies, each of said ducts communicating with said exhaust passage through a respective one of said sidewall openings and opening into the atmosphere through a respective one of said apertures of said streamlined bodies, each of said ducts being adapted for receiving gases from said exhaust passage and for expulsion of the same into the atmosphere in a direction varying from said first direction for producing a reactive force; a second plurality of valves, one of said valves being mounted in and variably positionable axially of each of said ducts for variably stopping said opening into the atmosphere thereof; actuating means operably connected to said first plurality of valve means and to said second plurality of valve means for variably positioning said first and second pluralities of valve means; and remote control means operably connected to said actuating means for governing operation of the latter.

3. For an aircraft having a propulsive jet engine, a thrust varying system comprising: an exhaust passage receiving gases from said engine and having a rearward opening for expulsion therefrom of said gases in a first, rearward direction relative to said passage, said passage having a sidewall provided with an opening; a door mounted on said sidewall and variably positionable for variably stopping said sidewall opening; means operative for variably positioning said door; a fin-like fairing mounted externally on said aircraft and having an opening communicating between the interior thereof and the atmosphere; and a duct mounted at least in part within said fairing, said duct communicating with said exhaust passage through said sidewall opening and with the atmosphere through said opening of said fairing, said duct being adapted for receiving gases from said exhaust passage and for expulsion of the same into the atmosphere in a second direction for producing a reactive force; and a plate mounted in said duct and connected to said means operative for variably positioning said door, said plate being movable generally transversely of said aircraft between a position wherein said opening in said fairing is closed and another position wherein said opening is unobstructed.

4. For an aircraft having a propulsive jet engine, a thrust varying system comprising: an exhaust passage receiving the combustion gases of said engine and having a rearward opening for expulsion of said gases therethrough in a first, rearward direction relative to said passage, said passage having a sidewall provided with a plurality of openings spaced about the circumference of said passage and an inner annular seat peripherally formed on said sidewall downstream of said sidewall openings; an axially displaceable conical member variably closable against said seat for restricting gaseous flow through said rearward opening of said exhaust passage; first control means for controlling axial displacement of said conical member; a first plurality of valves mounted on said sidewall, each one of said valves being variably positionable for variably stopping a respective one of said sidewall openings; a plurality of streamlined fin-like bodies symmetrically mounted on the exterior of said aircraft, each of said streamlined bodies being in register with a respective one of said sidewall openings and each of said streamlined bodies having an aperture communicating between the interior thereof and the atmosphere; a plurality of ducts, each of said ducts being mounted at least in part within a respective one of said streamlined fin-like bodies, each of said ducts communicating with said exhaust passage through a respective one of said sidewall openings and opening into the atmosphere through a respective one of said apertures of said streamlined bodies, each of said ducts being adapted for receiving gases from said exhaust passage and for expulsion of the same into the atmosphere in a direction varying from said first direction for producing a reactive force; a second plurality of valves, one of said valves being mounted in and variably positionable axially of each of said ducts for variably stopping said opening into the atmosphere thereof; a plurality of valve actuating means, each of said valve actuating means being operatively connected to a respective one of said duct-mounted valves and to a respective one of said sidewall-mounted valves for variably positioning said valves; and second control means comprising a plurality of units, each of said units being independently operable for individual control of a respective one of said plurality of valve actuating means.

5. The combination claimed in claim 4, said streamlined bodies symmetrically mounted on the exterior of said aircraft including airfoils of the aircraft.

References Cited in the file of this patent

UNITED STATES PATENTS 2,465,457  Johnston _____ Mar. 29, 1949

FOREIGN PATENTS 860,754  Germany _____ Dec. 22, 1952